United States Patent
James

(10) Patent No.: US 6,612,066 B1
(45) Date of Patent: Sep. 2, 2003

(54) ADJUSTABLE DEPTH FISHING BOBBER

(76) Inventor: David W. James, 8558 E. Melody Ct., Claremore, OK (US) 74017-2471

(*) Notice: Subject to any disclaimer, the term of this patent is extended or adjusted under 35 U.S.C. 154(b) by 0 days.

(21) Appl. No.: 10/256,708

(22) Filed: Sep. 27, 2002

(51) Int. Cl.$^7$ .............................................. A01K 91/00
(52) U.S. Cl. ....................................................... 43/43.14
(58) Field of Search ........................... 43/43.11, 43.14, 43/43.82

(56) References Cited

U.S. PATENT DOCUMENTS

| | | | | |
|---|---|---|---|---|
| 2,509,704 A | * | 5/1950 | Streitwieser | 43/43.12 |
| 2,527,437 A | * | 10/1950 | Matras | 43/44.87 |
| 2,531,806 A | * | 11/1950 | Coughlin | 43/44.91 |
| 2,726,474 A | | 12/1955 | Soskice | 43/43.14 |
| 2,761,238 A | * | 9/1956 | Shiverdecker | 43/43.14 |
| 2,763,088 A | * | 9/1956 | Cowsert | 43/43.14 |
| 2,803,082 A | | 8/1957 | Claybrook | 43/43.14 |
| 3,447,257 A | | 6/1969 | Ieda | 46/213 |
| 3,455,056 A | | 7/1969 | Cultrera | 43/44.91 |
| 3,597,871 A | | 8/1971 | Hansen | 43/43.14 |
| 3,664,053 A | * | 5/1972 | Beverly | 43/43.14 |
| 3,698,120 A | | 10/1972 | Grogan | 43/43.14 |
| 3,744,176 A | | 7/1973 | Bondhus | 43/43.14 |
| 3,757,453 A | | 9/1973 | Therres | 43/43.14 |
| 3,766,680 A | * | 10/1973 | Torme et al. | 43/16 |
| 3,990,172 A | | 11/1976 | Hagquist | 43/43.14 |
| 4,109,404 A | * | 8/1978 | Preeschl | 43/17 |
| 4,138,794 A | * | 2/1979 | Chiodini | 43/43.14 |
| 4,461,114 A | * | 7/1984 | Riead | 43/17.5 |
| 4,571,874 A | | 2/1986 | Smaw | 43/4.5 |
| 5,329,722 A | * | 7/1994 | Wilson | 43/44.94 |
| 5,608,985 A | * | 3/1997 | Kainec | 43/43.1 |

OTHER PUBLICATIONS

U.S. patent application Publication No. US 2002/0000060 A1, Pub. Date: Jan. 3, 2002, Inventor: Bennis.

* cited by examiner

*Primary Examiner*—Charles T. Jordan
*Assistant Examiner*—Jordan M Lofdahl
(74) *Attorney, Agent, or Firm*—Gable & Gotwals; Paul H. Johnson

(57) ABSTRACT

An adjustable depth fishing bobber having a hollow bobber housing for upright floatation having a top and a bottom opening, an elongated stem extending displaceably through said housing openings and having provision for the attachment of a fishing line to an upper end and a fishing leader to a lower end, a top cap affixed to the stem above the housing that normally engages the housing to sealably close the top opening, and a coiled spring surrounding the stem within the housing urging the stem downwardly with respect to the housing to normally close the top opening, the stem being upwardly displaceable relative to the housing whereby a quantity of water can be admitted into or drained from the housing to vary the buoyancy of the bobber.

3 Claims, 1 Drawing Sheet

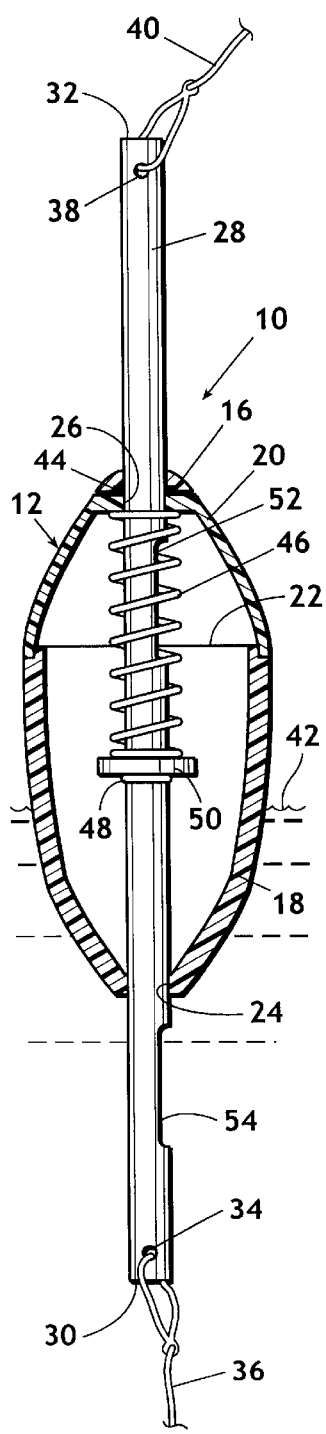
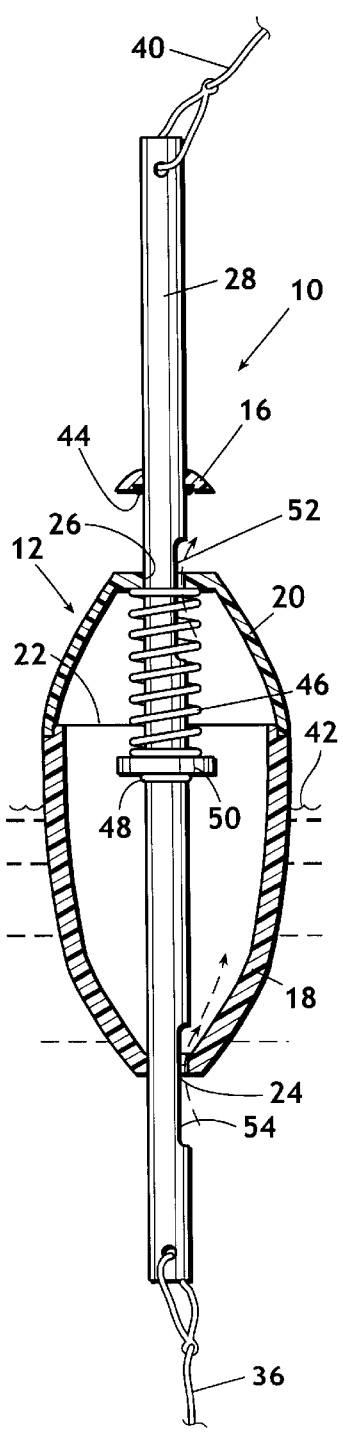
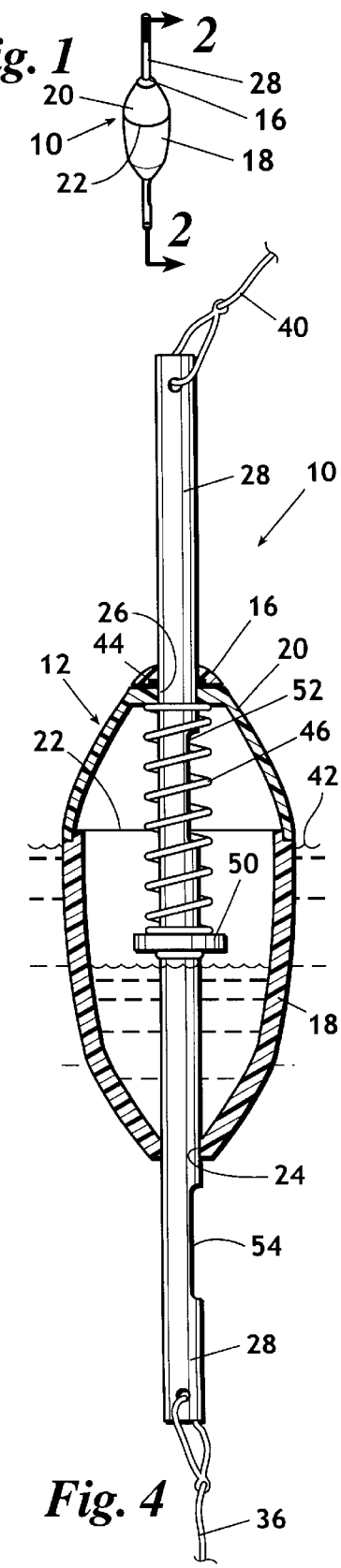
Fig. 1
Fig. 2
Fig. 3
Fig. 4

ADJUSTABLE DEPTH FISHING BOBBER

REFERENCE TO MICROFICHE APPENDIX

This application is not referenced in any microfiche appendix.

FIELD OF THE INVENTION

This invention relates to a bobber for use in fishing having provision at one end for the attachment of a fishing line and at the other end for a fishing leader, which in turn is attached to a fishhook. The buoyancy of the bobber is adjustable.

BACKGROUND OF THE INVENTION

An historically popular way to fish is by using a fishing pole having a fishing line extending to a bobber and a leader extending from the bobber to a fishhook on which bait is placed. In addition, a weight is normally affixed to the leader near the hook to pull the hook with the bait thereon downwardly from the bobber. The distance between the bobber and the hook is thereby a way of adjusting the depth at which the baited hook is maintained in the water. The bobber not only holds the baited hook suspended at a preselected depth below the water surface, but the bobber also provides a visual signal when a fish bites or nibbles on the bait. A skilled fisherman, by watching the bobber, knows when to jerk the line to set the hook in a biting fish.

If a bobber has too much buoyancy, a fish can bite or nibble on the bait and the fisherman will not be apprised of this fact. High buoyancy of a bobber prevents it from being significantly displaced with respect to the water surface by the action of a fish. On the other hand, if the bobber has too little buoyancy, then any minor engagement of the bait by a fish can cause a displacement of the bobber relative to the water surface that is misleading and can cause a fisherman to jerk the hook before a fish has actually taken the bait. In other words, according to the type and nature of the bait, the amount of buoyancy of the bobber can be important in providing information that a fisherman needs to know when to jerk the line—that is, set the hook in response to a fish bite.

For these reasons, the invention herein provides an adjustable depth fishing bobber that permits the buoyancy of the bobber to be readily and quickly adjusted by controlling the quantity of water within the interior of the bobber. In this way, a fisherman can adjust the buoyancy of the bobber without having to have any supplemental devices or tools. Further, when through fishing, water within the bobber can quickly and easily be drained so that it does not have to be kept inside of a fishing tackle box.

For an understanding of fishing bobbers, their uses, applications and various designs, reference may be had to the following previously-issued United States patents and a publication:

| U.S. Pat. No. | Publication | Inventor(s) | Title |
| --- | --- | --- | --- |
|  | US 2002/0000060 | Bennis | Two-Stage Fishing Bobber |
| 2,726,474 |  | Soskice | Floats for Fishlines |
| 2,803,082 |  | Claybrook | Fishing Float Having Weight-Adjusting Means |

-continued

| U.S. Pat. No. | Publication | Inventor(s) | Title |
| --- | --- | --- | --- |
| 3,447,257 |  | Ieda | Reversible Steering Member |
| 3,455,056 |  | Cultrera | Fishing Floats |
| 3,597,871 |  | Hansen | Fishing Float Device |
| 3,698,120 |  | Grogan | Float-Sinker |
| 3,744,176 |  | Bondhus | Casting Bubble |
| 3,757,453 |  | Therres | Fishing Line Float |
| 3,990,172 |  | Hagquist | Fishing Bobber |
| 4,461,114 |  | Riead | Fishing Float |
| 4,571,874 |  | Smaw | Casting Bobber with Predetermined Depth Setting |

BRIEF SUMMARY OF THE INVENTION

The invention herein provides an adjustable depth fishing bobber that can also be described as an adjustable buoyancy fishing bobber. The bobber is formed of a hollow bobber housing preferably made of thin-wall plastic halves each of which is a concave element. The bobber housing is hollow and oriented for upright floatation and has a top and a bottom opening.

An elongated stem extends displaceably through the housing openings. The stem has provision at the top end for the attachment of a fishing line and at a bottom end for the attachment of a fishing leader that extends to a fishhook. A top cap is affixed to the stem above the housing. The top cap normally engages the housing exterior surface to sealably close the top opening.

A coiled spring surrounds the stem within the housing and urges the stem downwardly with respect to the housing to normally close the top cap against the exterior surface of the housing to thereby close the top opening. The stem can be manually upwardly displaced relative to the housing to permit fluid—that is, air or water, to flow through the top and bottom openings so that a quantity of water may be admitted into or drained from the housing to thereby vary buoyancy of the housing.

In a preferred arrangement, a spring keeper is affixed to the stem within the housing. The spring is received on the stem and compressed between the spring keeper and an upper interior surface of the housing surrounding the top opening.

The stem preferably has an upper and a lower groove that, when the stem is displaced with respect to the housing, permits fluid to more readily flow through the top and bottom openings so that water and/or air can pass through as necessary to admit water into the housing or drain water from the housing.

A better understanding of the invention will be obtained from the following description of the preferred embodiment taken in conjunction with the attached drawing.

BRIEF DESCRIPTION OF THE DRAWINGS

FIG. 1 is an elevational isometric view of a fishing bobber of this invention showing the external appearance of the bobber.

FIG. 2 is an elevational cross-sectional view taken along the line 2—2. FIG. 1 showing the bobber in its normal position with a fragment of a fishing line attached to a top end and a fragment of a fishing leader attached to the bottom end. FIG. 2 shows the bobber in condition for maximum buoyancy and shows the bobber floating relatively high on the surface of water.

FIG. 3 shows the stem displaced upwardly relative to the body of the bobber in the condition wherein water is being admitted into the interior of the bobber to decrease its buoyancy. As water is admitted through a bottom opening, displaced air is discharged through a top opening.

FIG. 4 shows the stem in the normal position sealably closing the admission or drainage of water from the interior of the body. A quantity of water subsides within the body so that the buoyancy of the bobber is reduced and the bobber floats lower with respect to the water's surface.

DETAILED DESCRIPTION OF THE PREFERRED EMBODIMENTS

Referring to the drawings, FIG. 1 shows the exterior of a bobber that incorporates principles of this invention, the bobber being generally indicated by the numeral 10. External elements of the bobber shown in FIG. 1 includes a body 12, a stem 14 and a top cap 16.

FIGS. 2, 3 and 4 show cross-sectional views of the bobber and more details of its construction. The body generally indicated by the numeral 12 includes a lower thin-wall concave half 18 and a mating thin-wall concave upper half 20. The lower and upper halves 18 and 20 are preferably molded of inexpensive plastic materials and have circumferential open edges that join at a mating edge 22.

The bottom half 18 has a bottom opening 24 therein and in like manner, the body top half 20 has a top opening 26. Extending displaceably through openings 24 and 26 is a stem 28 having a bottom end 30 and a top end 32. Adjacent bottom end 30 is a small opening 34 that receives a fishing leader 36. In similar manner, adjacent top end 32 is an opening 38 that receives the end of a fishing line 40.

The bobber is used in the normal way that fishing bobbers have been for many years. Normally, the lower end of fishing leader 36 has a weight and a hook (not shown). Bait (not shown) is normally placed on the hook and the weight holds the bait at a preselected distance below the surface 42 of the body of water on which the bobber is being used. Thus, the function of bobber 12 is first, to maintain a baited hook at a preselected distance below water surface 42 since otherwise without a bobber or a way to add buoyancy, a baited hook, especially if it has a weight on the line adjacent to it, would normally rest on the bottom of the body of water and can easily then be entangled in brush, weeds and so forth. A second basic function of bobber 10 is to provide a visual indication to the fisherman when a fish is biting.

Secured to stem 28 above bobber body 12 is the top cap 16. As best seen in FIG. 3, the top cap 16 preferably includes a seal such as O-ring 44.

Within the interior of body 12 is a compression spring 46 that surrounds the stem 28. A spring keeper 48 is secured to stem 28. Spring 26 is compressably received on stem 28 between an upper interior surface of the body top half 20 and keeper 48. Spring keeper 48 may be of a variety of styles. In one arrangement a small groove can be formed on stem 28 with a C-shaped keeper 48 positioned in the groove. A washer 50 can then be placed on stem 28 in contact with keeper 48. Spring 46 extends between washer 50 and the interior top half of the body 20. Thus, as illustrated, a washer is positioned on the stem in engagement with a keeper 48 that is positioned within a narrow groove in the circumferential surface of the stem. In another embodiment, instead of using a keeper, a plastic washer can be glued or otherwise bonded directly onto the external surface of the stem 28. The particular manner of providing the spring keeper that, as illustrated, is formed of a keeper element 48 and a washer 50 is a design choice. The only requirement is that provision be made so that spring 46 be arranged to exert compressive downward force on stem 28 relative to the body 12.

In normal circumstances, the bobber will be in condition for maximum flotation when a fisherman takes the bobber out of his tackle box or first starts using it in which the interior of the bobber is void as shown in FIG. 2. If the fisherman believes that the maximum flotation, as in FIG. 2, causes the bobber to be insensitive to small or feeble bites by a fish, the fisherman can adjust the flotation. This is accomplished as seen in FIG. 3 in which the fisherman holds the body of the bobber partially submerged and upwardly raises stem 28 against the compressive force of spring 46. This removes top cap 16 from contact with the portion of the bobber upper half that surrounds top opening 26. This permits air to escape from the bobber permitting water to enter bottom opening 24. To improve the flow of water into the interior of the body 12 and to permit the escape of air out the top of the bobber, a top groove 52 is formed in the sidewall of stem 28, as well as a bottom groove 54. Grooves 52 and 54 are positioned so that in the normal relationship of stem 28 to body 12, the top groove 52 is totally interior of the body and the bottom groove 54 is totally exterior of the body as shown in FIGS. 2 and 4. Thus, in the normal position the top and bottom grooves 52 and 54 have no function in the normal operation of the bobber. However, when the buoyancy of the bobber is being changed, as shown in FIG. 3, stem 28 is upwardly raised with respect to the bobber, compressing spring 46, so that top groove 52 is in alignment with top opening 26 and the bottom groove 54 is in alignment with bottom opening 24. With the bobber partially submerged beneath the surface 42 of water as shown in FIG. 3, this displacement allows water to flow freely through bottom opening 24 past bottom groove 54 and air that is displaced as water enters the interior of the bobber to escape through top opening 26, past top groove 52. After the quantity of water desired has been admitted into the interior of the bobber, the stem is returned downwardly to the location shown in FIG. 4. In this location, more water cannot pass into the interior of the bobber as resisted by the air captured in the top part of the interior of the body 12. At the same time, the top and bottom grooves 52 and 54 are out of alignment with the top and bottom openings 26 and 24.

The bobber of this invention has been described in terms of its adjustable buoyancy. Buoyancy is directly related to the weight of the bobber—that is, the amount of water contained within the bobber. Thus, adjustable buoyancy is the same as adjustable weight. Therefore, the term "adjustable depth fishing bobber" is inclusive of "adjustable weight fishing bobber." The weight of the bobber is important to vary the buoyancy when the bobber is floating and also is important to provide casting ballast. That is, by varying the amount of water in the bobber its weight when being cast can be varied. This permits a fisherman to vary the weight (ballast) of the bobber for effective casting of the bobber.

The adjustable depth fishing bobber as has been described herein provides a bobber having advantages over the known prior art such as that previously identified and provides a bobber that permits a fisherman to quickly adjust the buoyancy of the bobber to his needs in a way that does not require supplemental weights or other attachments. Further, when the fisherman is through fishing and the bobber has been removed from the lake or stream where it has been employed, the fisherman can expeditiously empty water from the bobber by merely depressing the body 12 downwardly relative to stem 28 to the position as shown in FIG. 3 and any water remaining inside the body will be immediately drained through the bottom opening 24 past bottom groove 54.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. An adjustable depth fishing bobber:
    a hollow bobber housing for upright flotation having a top and a bottom opening;
    an elongated stem extending displaceably through said housing openings and having provision for the attachment of a fishing line to an upper end and a fishing leader to a lower end;
    a top cap affixed to said stem above said housing that normally engages said housing to sealably close said top opening;
    a coiled spring surrounding said stem within said housing normally urging said stem downwardly with respect to said housing whereby said top opening is normally closed by said top cap;
    a first short length groove in the exterior surface of an upper portion of said stem immediately below said top cap and positioned to be in alignment with said top opening to augment the flow of air through said top opening when said stem is upwardly displaced with respect to said housing; and
    a second short length groove in the exterior surface of a lower portion of said stem and positioned to be in alignment with said bottom opening when said stem is upwardly displaced with respect to said housing to facilitate adding water to or draining water from the interior of said housing whereby said upper and lower grooves are normally out of alignment with said upper and lower openings respectively and whereby said upper and lower openings are simultaneously opened by upward displacement of said stem to facilitate adding water to or draining water from the interior of said housing to vary the buoyancy thereof.

2. An adjustable depth fishing bobber according to claim 1 including a spring keeper affixed to said stem within said housing, said spring being compressed between said spring keeper and an upper interior surface of said housing surrounding said top opening.

3. An adjustable depth fishing bobber according to claim 1 wherein said housing is formed of a top concave part having said top opening therein and a bottom concave part having said bottom opening therein, the top and bottom parts being sealably attachable to form a unitary relatively thin shelled housing encompassing a central portion of the length of said stem having said spring received thereon.

* * * * *